Dec. 9, 1930.     G. A. MOORE     1,784,377
SET SCREW
Filed Feb. 20, 1930
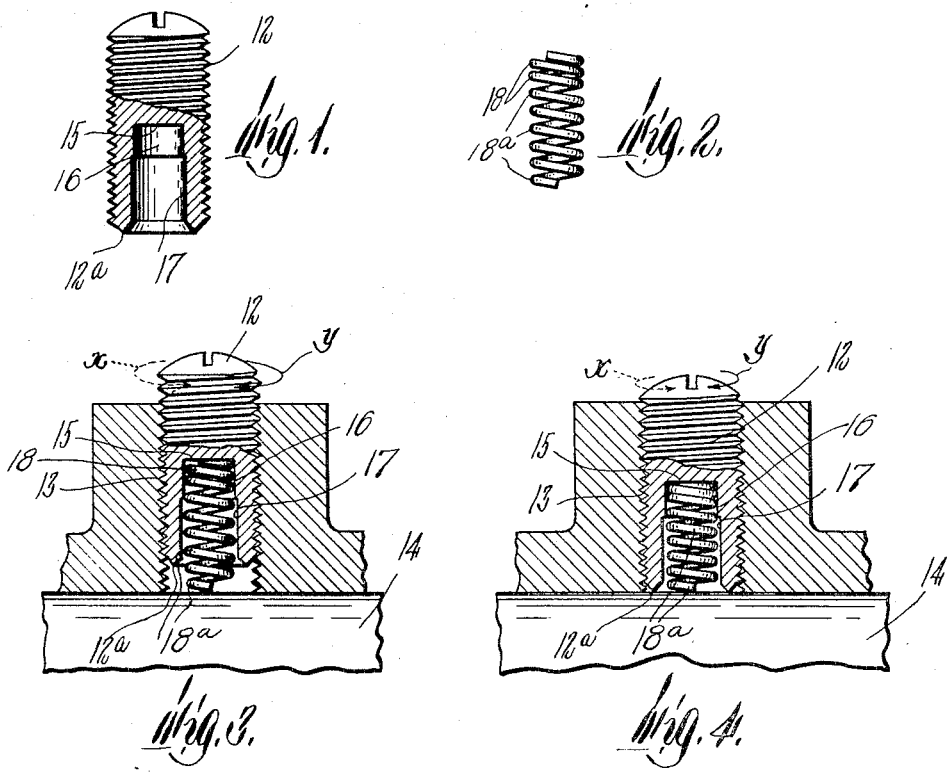
Inventor:
George A. Moore,
by Wright Brown Quinby May
Attys.

Patented Dec. 9, 1930

1,784,377

UNITED STATES PATENT OFFICE

GEORGE A. MOORE, OF BOSTON, MASSACHUSETTS

SET SCREW

Application filed February 20, 1930. Serial No. 429,927.

The object of this invention is to provide a set screw having means adapted, when the screw is turned into a tapped socket in one of two members locked together by the screw, to so oppose an accidental reverse turning movement of the screw as to prevent automatic loosening thereof.

Of the accompanying drawings forming a part of this specification,—

Figure 1 is a side view, showing the screw partly in section and partly in elevation.

Figure 2 shows the helical spring hereinafter described.

Figure 3 shows the screw and the spring engaged therewith partly turned into a tapped socket.

Figure 4 shows the screw and spring fully turned into the socket.

The same reference characters indicate the same parts in all of the figures.

12 designates a set screw adapted to be turned into a tapped socket 13, and having a driving tool-engaging outer end, a threaded periphery, an abutment-engaging inner end 12a and a bore concentric with the threaded periphery and open at the inner end thereof. The socket 13 may be formed in any member adapted to be locked by the set screw to a member constituting the screw abutment 14. Said bore includes an inner portion 16, of relatively small diameter, intersecting a pressing face 15, formed by the inner end or bottom of the bore, and an outer portion 17 of larger diameter than the inner portion.

A helical spring formed to bear at one end on the pressing face 15, and at its opposite end on the abutment 14, is inserted in the screw bore. The inner end portion of the spring, designated by 18, is in frictional binding engagement with the smaller bore portion 16 to prevent the spring from dropping from the screw, such engagement, and the bearing of the inner end convolution of the spring on the pressing face 15, causing the spring to turn with the screw.

The outer end portion of the spring, designated by 18a, extends loosely through the outer bore portion 17, so that it is free to expand and contract lengthwise, said portion being contracted when the screw is driven to its operative position (Figure 4).

The normal length of the spring, and the inclination of its convolutions are such that before the screw is fully driven to its operative position, the outer end convolution of the portion 18a projects considerably from the screw bore and contacts with the abutment 14, as shown by Figure 3, said convolution being inclined relative to the abutment.

The inclination of the spring convolutions is opposite that of the screw thread convolutions, so that the inclined outer end convolution of the portion 18a constitutes a one-way acting dog, adapted to slip on the abutment 14 when the screw is being rotated in the direction of the arrow $y$, to drive it into the tapped socket, and to have a biting engagement with the abutment to oppose an accidental unscrewing or retracting rotation of the screw in the direction of the arrow $x$. The inner end convolution of the screw is inclined, so that it bears on the pressing face 15, and constitutes another one-way acting dog functioning like the dog formed by the outer end convolution.

A screw embodying the invention may be much smaller than those shown by the drawings, and may be of the size employed for locking the shank of a door knob to the spindle thereof, the shank containing the tapped socket 13, and the spindle being the abutment 14.

I claim:

1. A set-screw having a driving tool-engaging outer end, a threaded periphery, an abutment-engaging inner end, and a longitudinal bore extending from the inner end, and having a closed end or bottom constituting a pressing face, an inner portion intersecting said face and of relatively small diameter, and an outer portion of larger diameter, combined with a helical spring inserted in the bore and normally projecting from the inner end of the screw, the inner end portion of the spring being in frictional binding engagement with the inner bore portion and bearing on the pressing face, the outer end portion of the spring extending loosely through the outer bore portion, so that it is free to expand and contract lengthwise, the outer end convolution of the spring being inclined so that it constitutes a one-way acting dog adapted to slip on an abutment when the screw is turned in one direction, and have a biting engagement with the abutment to oppose a turning movement of the screw in the opposite direction.

2. A set-screw having a driving tool-engaging outer end, a threaded periphery, an abutment-engaging inner end, a longitudinal bore extending from the inner end, and having a closed bottom constituting a pressing face, an inner portion intersecting said face, combined with a spring inserted in the bore and normally projecting from the inner end of the screw said spring being in frictional binding engagement with the inner bore portion and bearing on the pressing face and free to expand and contract lengthwise, the outer end convolution of the spring being inclined so that it constitutes a one-way acting dog adapted to slip on an abutment when the screw is turned in one direction, and having a biting engagement with the abutment to oppose a turning movement of the screw in the opposite direction.

In testimony whereof I have affixed my signature.

GEORGE A. MOORE.